US012481824B2

(12) United States Patent
Saville et al.

(10) Patent No.: US 12,481,824 B2
(45) Date of Patent: Nov. 25, 2025

(54) CONTENT ASSOCIATION IN FILE EDITING

(71) Applicant: INTERNATIONAL BUSINESS MACHINES CORPORATION, Armonk, NY (US)

(72) Inventors: Melita Saville, Winchester (GB); Timothy Andrew Moran, Southampton (GB); Clive Harris, Nr. Alersford (GB); Caroline Sarah Courtenay McNamara, Hants (GB); Natasha Katherine Mckenzie-Kelly, Salisbury (GB); Abigail Rose Bettle-Shaffer, Andover (GB)

(73) Assignee: International Business Machines Corporation, Armonk, NY (US)

(*) Notice: Subject to any disclaimer, the term of this patent is extended or adjusted under 35 U.S.C. 154(b) by 74 days.

(21) Appl. No.: 17/657,191

(22) Filed: Mar. 30, 2022

(65) Prior Publication Data
US 2023/0315980 A1 Oct. 5, 2023

(51) Int. Cl.
*G06F 40/194* (2020.01)
*G06F 40/103* (2020.01)
(Continued)

(52) U.S. Cl.
CPC .......... *G06F 40/194* (2020.01); *G06F 40/103* (2020.01); *G06F 40/197* (2020.01); *G06F 40/205* (2020.01)

(58) Field of Classification Search
None
See application file for complete search history.

(56) References Cited

U.S. PATENT DOCUMENTS 5,369,577 A    11/1994 Kadashevich
5,408,599 A *  4/1995 Nomura ................ G06F 40/131
                                          707/E17.013
(Continued)

FOREIGN PATENT DOCUMENTS

CN    101419717 A  *  4/2009
WO    2018134845 A1    7/2018

OTHER PUBLICATIONS

"Searching the Internet for Common Elements in a Document in order to Detect Plagiarism", Justia Patents, Software Analysis and Forensic Engineering Corporation, Oct. 17, 2008, 22 pgs., <https://patents.justia.com/patent/9043375>.

(Continued)

*Primary Examiner* — Tamara T Kyle
*Assistant Examiner* — Tyler Schallhorn
(74) *Attorney, Agent, or Firm* — James Olsen; Andrew D. Wright; Calderon Safran & Wright P.C.

(57) ABSTRACT

Computer technology for content association in file editing. The method includes providing one or more files including a first element currently being edited and including at least one other element of a different format to the first element. The method analyzes changes to the first element to obtain information relating to the changes and analyzing the contents of at least one other element. The method identifies any of the other elements that are correlated elements to the first element by determining an association between the contents of the other element and the changes of the first element and instigates a corresponding change to the contents of any correlated elements.

11 Claims, 7 Drawing Sheets

(51) Int. Cl.
*G06F 40/197* (2020.01)
*G06F 40/205* (2020.01)

(56) References Cited

U.S. PATENT DOCUMENTS

| | | | | |
|---|---|---|---|---|
| 5,752,055 | A * | 5/1998 | Redpath | G06F 16/94 |
| | | | | 715/209 |
| 7,487,190 | B2 * | 2/2009 | Black | G06F 40/197 |
| | | | | 707/999.203 |
| 7,852,499 | B2 * | 12/2010 | Dejean | G06F 40/258 |
| | | | | 715/204 |
| 8,208,737 | B1 * | 6/2012 | Le | G06V 30/416 |
| | | | | 382/229 |
| 8,254,679 | B2 * | 8/2012 | Marchesotti | G06T 7/194 |
| | | | | 382/254 |
| 8,261,188 | B2 * | 9/2012 | Weiss | G06F 40/186 |
| | | | | 715/255 |
| 8,352,857 | B2 * | 1/2013 | Filippova | G06F 40/134 |
| | | | | 715/256 |
| 8,503,769 | B2 * | 8/2013 | Baker | G06F 16/58 |
| | | | | 715/234 |
| 8,775,436 | B1 * | 7/2014 | Zhou | G06V 30/416 |
| | | | | 707/748 |
| 9,043,375 | B2 | 5/2015 | Zeidman | |
| 9,129,216 | B1 * | 9/2015 | Andras | G06F 16/583 |
| 9,152,700 | B2 * | 10/2015 | Duerig | G06F 18/217 |
| 9,183,436 | B2 * | 11/2015 | Baker | G06F 16/58 |
| 9,361,286 | B2 * | 6/2016 | Nouard | G06F 40/18 |
| 9,454,600 | B2 * | 9/2016 | Duerig | G06V 10/42 |
| 9,607,216 | B2 * | 3/2017 | Bostick | G06V 30/40 |
| 9,734,139 | B2 * | 8/2017 | Reeves | G06F 40/197 |
| 10,140,369 | B2 | 11/2018 | Desai | |
| 10,489,498 | B2 * | 11/2019 | Vinay | G06F 40/295 |
| 10,713,432 | B2 * | 7/2020 | Goyal | G06F 16/288 |
| 10,719,702 | B2 * | 7/2020 | Saha | G06V 30/413 |
| 10,747,952 | B2 * | 8/2020 | Aymeloglu | G06F 3/0484 |
| 10,783,633 | B2 * | 9/2020 | Bronkalla | G16H 30/40 |
| 10,825,173 | B2 * | 11/2020 | Bronkalla | G16H 30/20 |
| 10,846,466 | B2 * | 11/2020 | Vinay | G06F 40/166 |
| 10,877,938 | B2 * | 12/2020 | Chen | H04L 67/1095 |
| 11,194,958 | B2 * | 12/2021 | Maneriker | G06N 20/00 |
| 11,210,508 | B2 * | 12/2021 | Miller | G06F 40/205 |
| 11,210,511 | B2 * | 12/2021 | Saha | G06V 30/413 |
| 11,361,212 | B2 * | 6/2022 | Bazzani | G06V 10/764 |
| 2003/0061201 | A1 * | 3/2003 | Grefenstette | G06F 16/93 |
| 2004/0015785 | A1 * | 1/2004 | Lin | G06F 40/10 |
| | | | | 715/255 |
| 2006/0047682 | A1 * | 3/2006 | Black | G06F 40/143 |
| | | | | 707/999.102 |
| 2007/0011211 | A1 * | 1/2007 | Reeves | G06F 40/194 |
| | | | | 707/999.203 |
| 2008/0077847 | A1 * | 3/2008 | Dejean | G06F 40/258 |
| | | | | 715/229 |
| 2009/0254816 | A1 * | 10/2009 | Weiss | G06F 40/186 |
| | | | | 715/255 |
| 2009/0254845 | A1 * | 10/2009 | Weiss | G06F 40/174 |
| | | | | 715/764 |
| 2010/0070844 | A1 * | 3/2010 | Aymeloglu | G06F 40/279 |
| | | | | 715/810 |
| 2010/0092085 | A1 * | 4/2010 | Marchesotti | G06T 11/60 |
| | | | | 382/254 |
| 2010/0107045 | A1 * | 4/2010 | Filippova | G06F 40/134 |
| | | | | 715/205 |
| 2010/0318892 | A1 * | 12/2010 | Teevan | G06F 16/958 |
| | | | | 715/229 |
| 2011/0026899 | A1 | 2/2011 | Lussier | |
| 2012/0151312 | A1 * | 6/2012 | Clee | G06F 40/134 |
| | | | | 715/205 |
| 2012/0163707 | A1 * | 6/2012 | Baker | G06F 16/58 |
| | | | | 382/159 |
| 2012/0195508 | A1 * | 8/2012 | Noyes | G06F 16/532 |
| | | | | 382/218 |
| 2012/0284617 | A1 * | 11/2012 | Nouard | G06F 16/24568 |
| | | | | 715/255 |
| 2013/0055069 | A1 * | 2/2013 | Seo | G06F 40/186 |
| | | | | 715/255 |
| 2013/0315480 | A1 * | 11/2013 | Baker | G06F 16/58 |
| | | | | 382/161 |
| 2015/0169738 | A1 * | 6/2015 | Duerig | G06V 30/194 |
| | | | | 707/E17.084 |
| 2015/0169999 | A1 * | 6/2015 | Duerig | G06F 18/29 |
| | | | | 382/159 |
| 2015/0317390 | A1 * | 11/2015 | Mills | G06F 16/35 |
| | | | | 707/777 |
| 2016/0070742 | A1 * | 3/2016 | Myslinski | G06F 16/2365 |
| | | | | 707/690 |
| 2016/0292502 | A1 * | 10/2016 | Bostick | G06V 10/768 |
| 2016/0378738 | A1 * | 12/2016 | Derbakova | G06F 40/131 |
| | | | | 715/256 |
| 2016/0378739 | A1 * | 12/2016 | Derbakova | G06F 40/194 |
| | | | | 715/780 |
| 2018/0025023 | A1 * | 1/2018 | Chen | G06F 16/00 |
| | | | | 707/625 |
| 2018/0032626 | A1 * | 2/2018 | Ben-Aharon | G06F 16/951 |
| 2018/0285326 | A1 * | 10/2018 | Goyal | G06F 40/197 |
| 2018/0286459 | A1 * | 10/2018 | Li | G06F 16/61 |
| 2019/0138805 | A1 * | 5/2019 | Saha | G06V 30/413 |
| 2019/0155880 | A1 * | 5/2019 | Vinay | G06F 40/16 |
| 2019/0251150 | A1 * | 8/2019 | Vinay | G06F 9/451 |
| 2019/0333217 | A1 * | 10/2019 | Bronkalla | G16H 50/70 |
| 2019/0333218 | A1 * | 10/2019 | Bronkalla | G06T 7/0014 |
| 2020/0081964 | A1 * | 3/2020 | Maneriker | G06F 40/103 |
| 2020/0302167 | A1 * | 9/2020 | Saha | G06V 30/418 |
| 2021/0073617 | A1 * | 3/2021 | Bazzani | G06V 10/82 |
| 2021/0209353 | A1 * | 7/2021 | Miller | G06F 40/30 |
| 2021/0250390 | A1 | 8/2021 | Clark | |
| 2022/0309091 | A1 * | 9/2022 | Bansal | G06V 20/635 |
| 2023/0367841 | A1 * | 11/2023 | Ben-Aharon | G06F 16/25 |

OTHER PUBLICATIONS

Hiyoshi, et al., "Drawing Pictures from Natural Language and Direct Manipulation", Proceedings of the 15th Conference on Computational Linguistics—vol. 2, Association for Computational Linguistics, Aug. 1994, 5 pgs., doi = 10.3115/991250.991262.

Mell et al., "The NIST Definition of Cloud Computing", National Institute of Standards and Technology, Special Publication 800-145, Sep. 2011, 7 pages.

Mukherjee, A., "Automatic Diagram Drawing Based on Natural Language Text Understanding", Indian Institute of Engineering, Science and Technology, Shibpur, 2014, 214 pgs.

* cited by examiner

CONTENT ASSOCIATION IN FILE EDITING

BACKGROUND

The present invention relates to file editing, and more specifically, to associating content elements when editing files.

Documentation frequently consists of different formats of information, for example, text and graphics or text and video. The different formats of information often contain related content. For example, text might describe the elements of the architecture of a software product and that architecture might also be represented in an image.

Each format has its own file types and these files are typically created and maintained in different software programs. The files might even be created and maintained by different people in a document creation and maintenance workflow. The different formats might be published together, for example, as a web page of documentation that contains text and an image. Alternatively, they might exist separately, for example, as a web page of text in the product documentation and a video in a blog on a social site.

When a change is made to one format of information, a corresponding change to the same information in another format is made only if an author manually identifies the relationship between the two formats. This is prone to human error. This is exacerbated by the separation in tools, source repositories, and ownership of the different file types. A frequent outcome is that one format is changed but an alternative format is left unchanged. The different formats become inconsistent and inaccurate.

SUMMARY

According to an aspect of the present invention there is provided a computer-implemented method for content association in file editing, said method provided by one or more processors of a computer system and comprising: providing one or more files including a first element currently being edited and including at least one other element of a different format to the first element; analyzing changes to the first element to obtain information relating to the changes; analyzing the contents of at least one other element; identifying any of the other elements that are correlated elements to the first element by determining an association between the contents of the other element and the changes of the first element; and instigating a corresponding change to the contents of any correlated elements.

According to another aspect of the present invention there is provided a system for content association in file editing, comprising: a processor and a memory configured to provide computer program instructions to the processor to execute the function of the components; a file providing component for providing one or more files including a first element currently being edited and including at least one other element of a different format to the first element; a first element analyzing component for analyzing changes to the first element to obtain information relating to the changes; another element analyzing component for analyzing the contents of the at least one other element; a correlated element component for identifying any of the other elements that are correlated elements to the first element including a content associating component for determining an association between the contents of the other element and the changes of the first element; and an instigating component for instigating a corresponding change to the contents of any correlated elements.

According to a further aspect of the present invention there is provided a computer program product for content association in file editing, the computer program product comprising a computer readable storage medium having program instructions embodied therewith, the program instructions executable by a processor to cause the processor to: provide one or more files including a first element currently being edited and including at least one other element of a different format to the first element; analyze changes to the first element to obtain information relating to the changes; analyze the contents of at least one other element; identify any of the other elements that are correlated elements to the first element by determining an association between the contents of the other element and the changes of the first element; and instigate a corresponding change to the contents of any correlated elements.

According to an aspect of the present invention, there is a method, computer program product and/or system that performs the following operations (not necessarily in the following order): (i) receiving a first file characterized by a text format that corresponds to human understandable text; (ii) receiving a second file characterized by an audio format that corresponds to an audio presentation; (iii) determining, by machine logic, that the human understandable text of the first file corresponds to the audio presentation of the second file the human understandable text of the first file corresponds to the audio presentation of the second file; (iv) responsive to the determination that the human understandable text of the first file corresponds to the audio presentation of the second file, recording file association data between the first and second files, with the association data being indicative that that the first and second files have similar content in different formats; (v) receiving first file change data indicating that text content of the first file has been changed and identifying the change in the text content of the first file; and (vi) responsive to the receipt of the first file change data and further responsive to the recording of the association data between the first file and the second file, changing audio content of the second file so that the change in audio content reflects the change in text content identified by the first file change data.

The computer readable storage medium may be a non-transitory computer readable storage medium, and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for content association in file editing. The method identifies correlations between elements of a file or a group of files based on their similarities and instigates a change to the identified correlated elements that are in different formats.

The method may be activated when editing a file in an editing tool where the file contains elements in alternative formats, for example, text, audio, image, video, etc. The elements of the file are analyzed to establish the contents of each element. For example, the analysis may use text comparison, voice recognition, optical character recognition, and/or natural language understanding and parsing the resultant text. Correlations between elements are identified based on the similarity between their contents. The correlations may also take into account the proximity of the elements in the file. Changes made to an element are tracked and the method identifies whether the edited element has correlated elements that should also be edited and alerts the user to edit the correlated element.

The content association when file editing is an improvement in the technical field of media content generally and more particularly in the technical field of controlling consistency in media content.

Figure 1A:
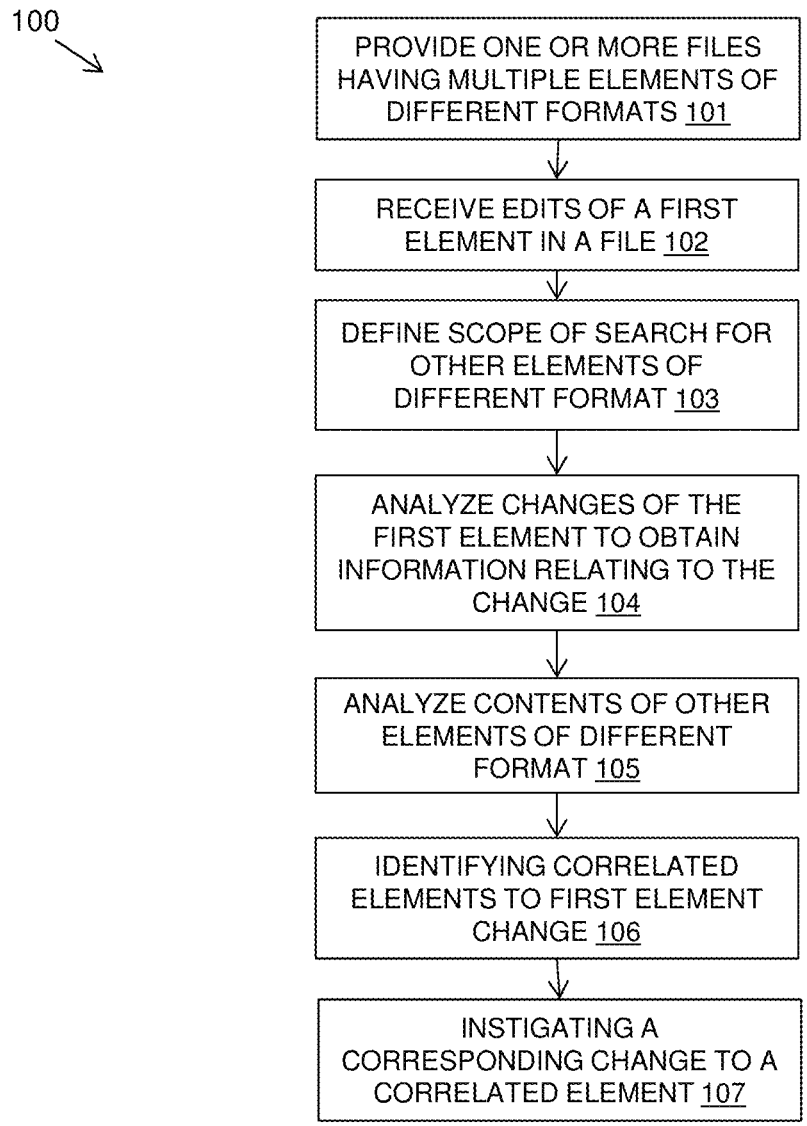
FIG. 1A is a flow diagram of an example embodiment of a method in accordance with embodiments of the present invention.

Referring to FIG. 1A, a flow diagram 100 shows an example embodiment of the described method for content association in file editing. The file editing may be carried out in an editing tool and the described method may be provided as an extension to the editing tool.

The method includes providing 101 one or more files including multiple elements of different formats. The different formats of the multiple elements may have their own file types and may be, for example, text, audio, image, graphics, video, etc. Edits 102 of a first element of a file of the one or more files are received.

The editing tool may have a customizable setting to define 103 the scope of a search for related information in a different format to the first element that are in the one or more files. This scope or defined proximity may be within the file that is open for editing or it could be within a collection of the files. The method does not need access to the source of the target file; an output format would be sufficient to detect the presence of an element of a different format to the one being edited.

The method may analyze 104 changes to the first element to obtain information relating to the change. The analysis of the first element may include storing a before state and an after state of the first element in a temporary storage area and comparing the before and after state to determine changes. The analysis may include parsing changes to the first element and may generate keywords for use when identifying correlated elements. This may involve establishing a model for analyzing and classifying a change to the first element.

The method may analyze 105 the contents of the other elements of different format to the first element that are within the defined scope. The analyzing of the other elements may be triggered in response to receiving 102 the edits to the first element. The analyzing of the other elements may include parsing the contents to resolve any information provided in the other elements.

The method may identify 106 any of the other elements of a different format to the first element that are correlated elements to the first element. The other elements may be identified by determining a correlation between the analyzed contents of the other element and the analyzed changes of the first element using cognitive processing to identify associated content.

The method may instigate 107 a corresponding change to any correlated elements to conform to the editing of the first element. The instigating may issue an alert to a user of a correlated element and/or may automatically change a correlated element to conform with changes to the first element.

Figure 1B:
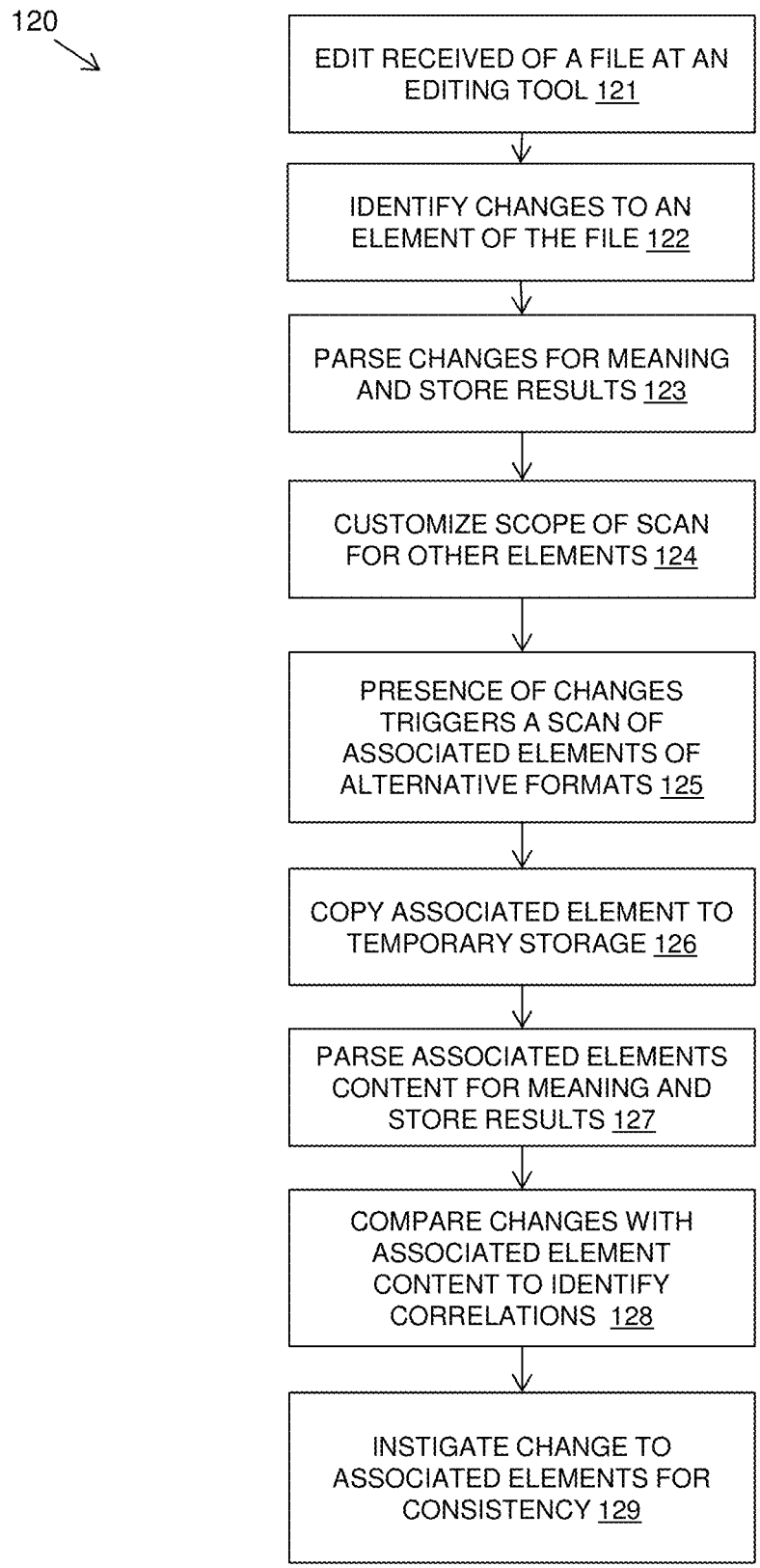
FIG. 1B is a flow diagram of another example embodiment of a method in accordance with embodiments of the present invention.

Referring to FIG. 1B, a flow diagram 120 shows another example embodiment of the described method.

Edits are received 121 when the user opens the source of a file in an editing tool and starts to edit. Changes are identified 122 in an element of the file. For example, this may be the text element of a file. The before state and the after state may be stored in a temporary storage area and compared so that the changes can be identified. This is similar to version control processing used in authoring or source control tools to identify that something has changed in a file before it is closed.

The changes are parsed 123 to understand the change that has been made. The parsing technology depends on the input file format: for example, text comparison, voice recognition for audio files, optical character recognition for images, etc. This is supplemented with the addition of artificial intelligent techniques for understanding.

The following are some examples of changes: the change may be a change in names, for example, widget A changed to widget B; the change may be a change in elements, for example, a new element or component may be added to the information that is described in the text; and/or the change may be a change in process or associations, for example, names or components are unchanged, but something is changed about their relationships or flows.

The scope of a scan for associated elements of different format may be customized 124. The editing tool may have a customizable setting to define the scope of a search for related information in another format. This scope may be within the file that is open for editing or it may be within a collection of files.

When a change is made to a file element, such as a document, the method may establish if alternative format elements exist within a specified perimeter of the file element being changed. This step identifies potential alternative formats that could possibly be affected. For example, this may establish if there are any diagrams near this text that are referenced in the text. The term "perimeter" defines how far or the scope that the system should look for a potential impact. For example, this may be within a single document, within a library of documents, within linked documents, or within documents that have been historically edited together.

The presence of changes in the original file being edited, plus the scope setting in the editing tool, triggers 125 a scan of files that are within the defined scope for any included or referenced alternative formats, such as diagrams or video. At this point, there is no knowledge about the contents of the elements in these alternative formats, they are simply identified if they exist.

When alternative formats are found, these are copied 126 as associated elements to a temporary storage area and the associated elements are parsed 127 using known parsing technologies and artificial intelligence techniques appropriate to the format.

In the temporary storage area, the changes identified 122 in the edited element are compared 128 with the contents of the associated element of alternative formats. Cognitive processing may be used to establish whether there is correlation between the contents of the associated elements and the edited element. This may determine if the same information is presented in the different formats. This may extract key terms, sentiment etc. from the edited element, scan the alternative formats of the associated elements for those key terms and assess the probability of similarity between the content of each format. When a correlation is found, for example, similar names, elements, or processes or relationships, there is a need to update the associated element in the alternative format.

This conforming update or change is instigated 129 by flagging to the author the correlation and the need to keep both text format and the alternative format in sync. Implementation extensions may include having the change made automatically. For example, a change to a diagram may use natural language processing for diagram creation. The method may include extending source delivery tools or pipelines to reject the commit of a changed file in one format if potential alternative formats exist and have not been changed.

Figure 2:
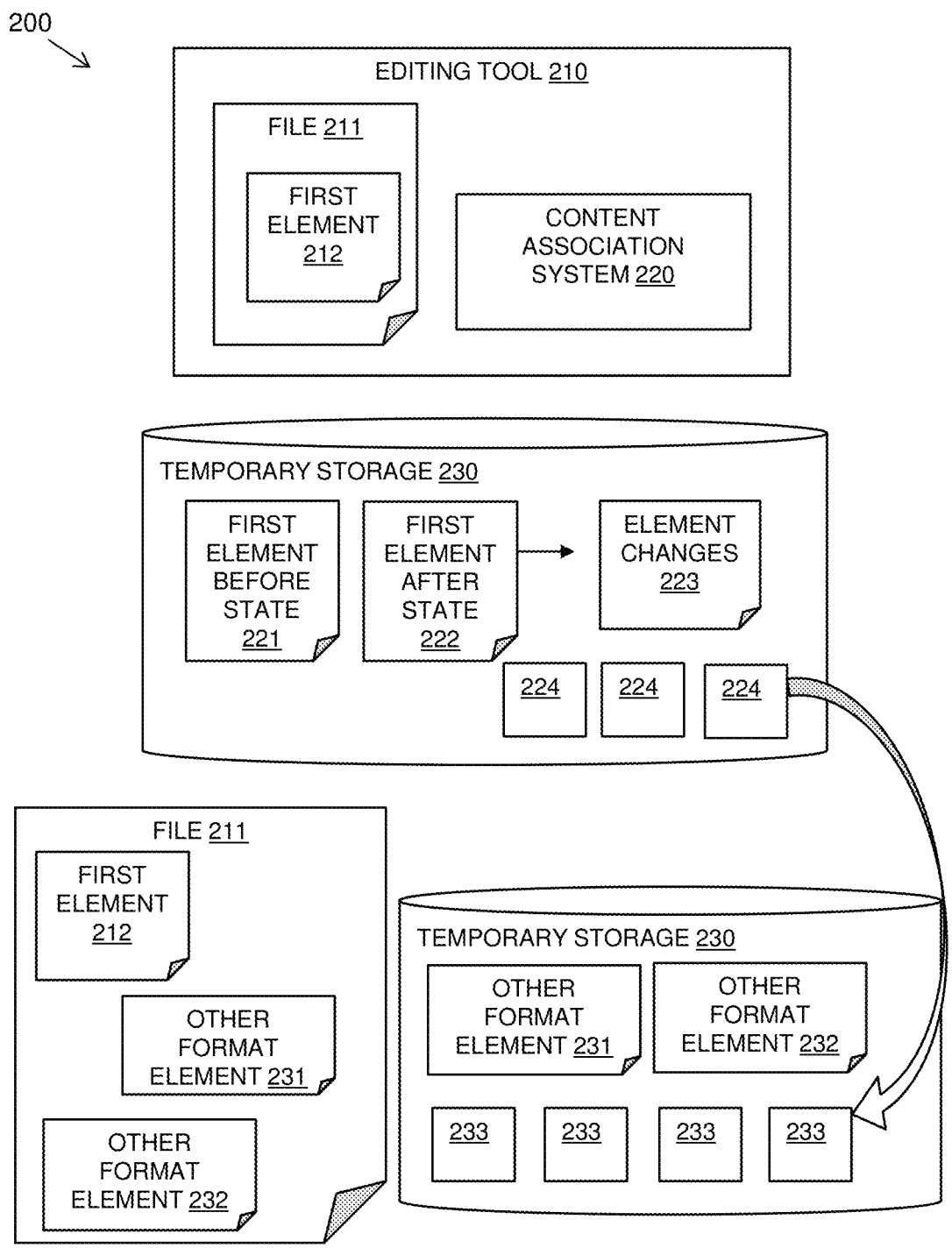
FIG. 2 is a schematic diagram of an example embodiment of a method in accordance with embodiments of the present invention.

Referring to FIG. 2, a schematic diagram 200 shows components as used in the method described in FIG. 1B. An editing tool 210 may have a content association system 220 for providing the described functionality. A first element 212 of a file 211 is edited. A temporary storage 230 is used to store a before state of the first element 221 and an after state of the first element 222 and identified changes 223 between the two states. The changes 223 are parsed for meaning and the results are stored 224.

The presence of changes 223 triggers a scan of file 211 for associated files for alternative formats 231, 232. Any alternative formats are copied to the temporary storage 230 and the format elements 231, 232 are parsed for meaning and the results 233 are stored. The stored results 233 are compared to the stored results of the changes 223 to find correlations.

An example embodiment of the step of parsing changes to a file is described in further detail. A model may be established for analyzing and classifying the change made to a text file based on analysis of the file before change, and analysis on the before-and-after differences to that file.

The model for analysis of the content of the text file and the summary of differences uses known semantic analysis and Natural Language Classification techniques, to include:
  Keyword extraction;
  Establishing relationships between objects: this word is always followed by this word;
  Parsing for lexical elements such as verbs and nouns, sentences, paragraphs, headings;
  Establishing subject-verb-object relationships (called "SAO" in semantic analysis);
  Establishing sequences, for example, numbered items or steps, sequential words like "before" and "next";
  Associating significance with objects such as "Note" or words such as "Important:";
  Establishing domain of information based on relationship between objects in the input; and
  Identifying significant typography, for example, in this domain, capitalized words are commands.

From the summary of difference, the type of change is classified:
  Typographical—there is text, and it is changed in case or punctuation;
  Name change—the name of an object is changed;
  Definition—the definition of an object is changed;
  Sequential—there are steps, and they are reordered;
  Architectural—new objects are introduced or objects are removed or changed;
  Processing—there is flow or interaction between objects and this is changed;
  Significance—frequency of occurrence of an object is changed and/or it becomes associated with importance words like "Danger", "Important".

An equivalent model may be established for analyzing and classifying the contents of a non-text file based on analysis of the file and a summary of before-and-after differences to that file.

The model for analysis of the content of the non-text file and the summary of differences uses known semantic analysis and Natural Language Classification, as above, for the audio and text elements of diagrams or video, with the addition of spatial or graphical/diagrammatic analysis techniques such as establishing relationships between objects with visual cues like arrows or flow chart notation or intersections.

An example execution of the method may include the following.

A text file may be edited, for example, a file that is used in software documentation. The text file may be applied, and the difference of changes determined through the analysis and classification model above to classify the type of change and to generate keywords to search for equivalent content in alternative media.

Using these generated keywords, the method may search a user-defined scope (for example, intranet, internet) for equivalent content in any available media. The returned content is applied through the analysis and classification model above to discard any content that is not relevant to the change being made. For example, if the change is to a sequence of steps, content is only returned in which the steps are present. If the change is to a relationship between two objects, content is only returned in which both objects are present and have a semantic or graphical relationship. The author makes the equivalent change in the alternative media.

The described method removes inconsistency and inaccuracy in information in file elements of different format that may otherwise lead to user confusion as the user is not sure which of the alternative formats contains the correct information. The need for accurate, alternative formats of information may be a legal requirement in some instances due to accessibility requirements. For example, any information presented as an image must also have an alternative and accurate text presentation.

Figure 3:
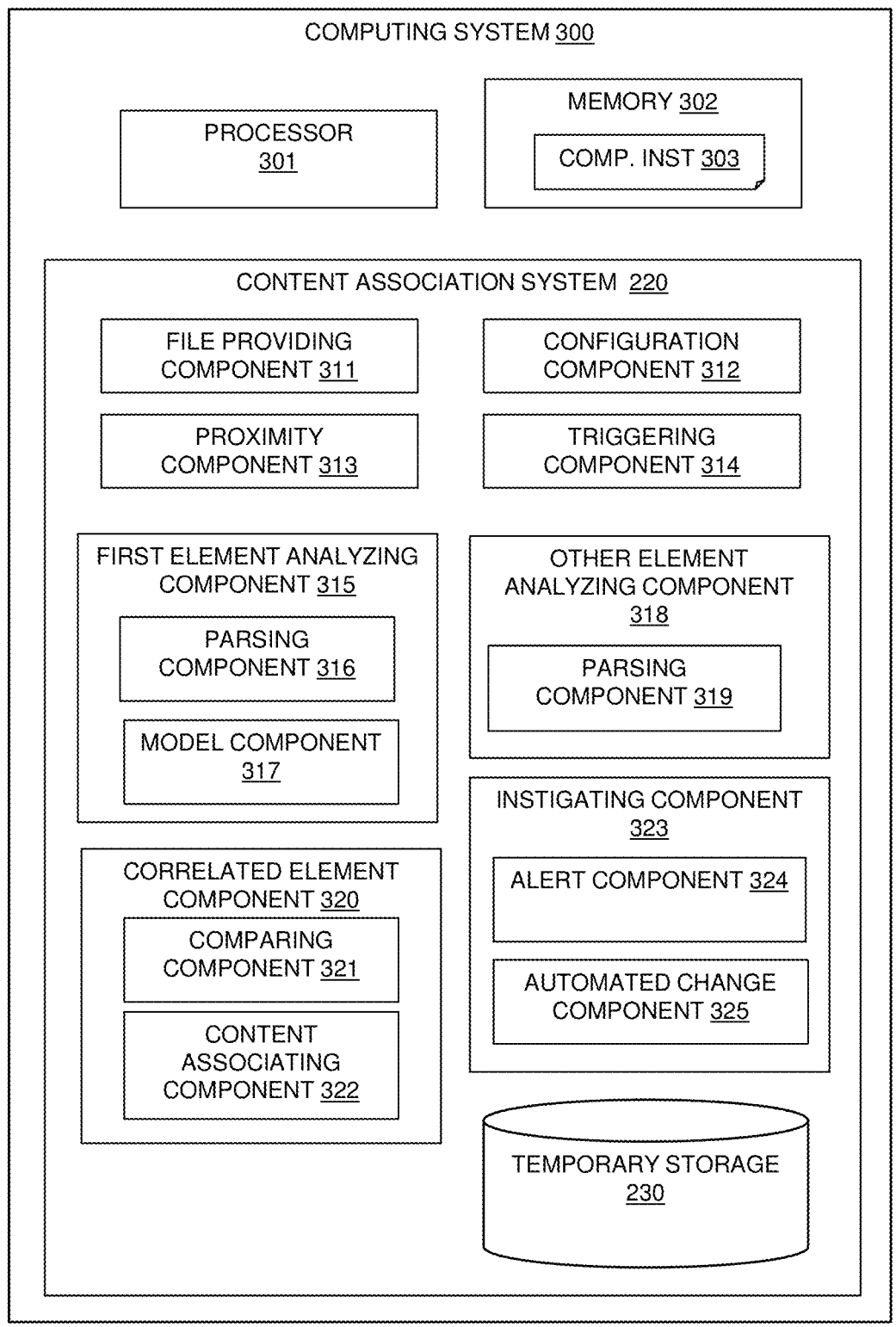
FIG. 3 is block diagram of an example embodiment of a system in accordance with embodiments of the present invention.

Referring to FIG. 3, a block diagram shows a computing system 300 in which the described content association system 220 may be implemented.

The computing system 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The content association system 220 may be provided as part of or an extension to a file editing tool and includes a file providing component 311 for providing one or more files including a first element currently being edited and including at least one other element of a different format to the first element. The content association system 220 may include a configuration component 312 for configuring a scope within the one or more files in which the at least one other element is provided and a proximity component 313 for defining a proximity to the first element in which the at least one other element is located. The content association system 220 may include a triggering component 314 for triggering analyzing the contents of at least one other element in response to receiving changes to the first element.

The content association system 220 may include a first element analyzing component 315 for analyzing changes to the first element to obtain information relating to the changes. The first element analyzing component 315 may include a parsing component 316 for parsing a language content of the changes and a model component 317 for analyzing and classifying a change to the first element using an established model.

The content association system 220 may include another element analyzing component 318 for analyzing the contents of at least one other element. The other element analyzing component 318 may include a parsing component 319 for parsing the language content of the contents of at least one other element. The other element analyzing component 318 may also include analysis tools for analyzing the element formats.

The content association system 220 may include a correlated element component 320 for identifying any of the other elements that are correlated elements to the first element. The correlated element component 320 may include a comparing component 321 for comparing the determined changes to the analyzed contents of at least one other element.

The correlated element component 320 may also include a content associating component 322 for determining an association between the contents of the other element and the changes of the first element and may use cognitive processing to identify associated content.

The content association system 220 may include an instigating component 323 for instigating a corresponding change to the contents of any correlated elements. The instigating component 323 may include an alert component 324 for issuing an alert to a user of a correlated element. The instigating component 323 may also or alternatively include an automated change component 325 for automatically changing a correlated element to conform with changes to the first element.

Figure 4:
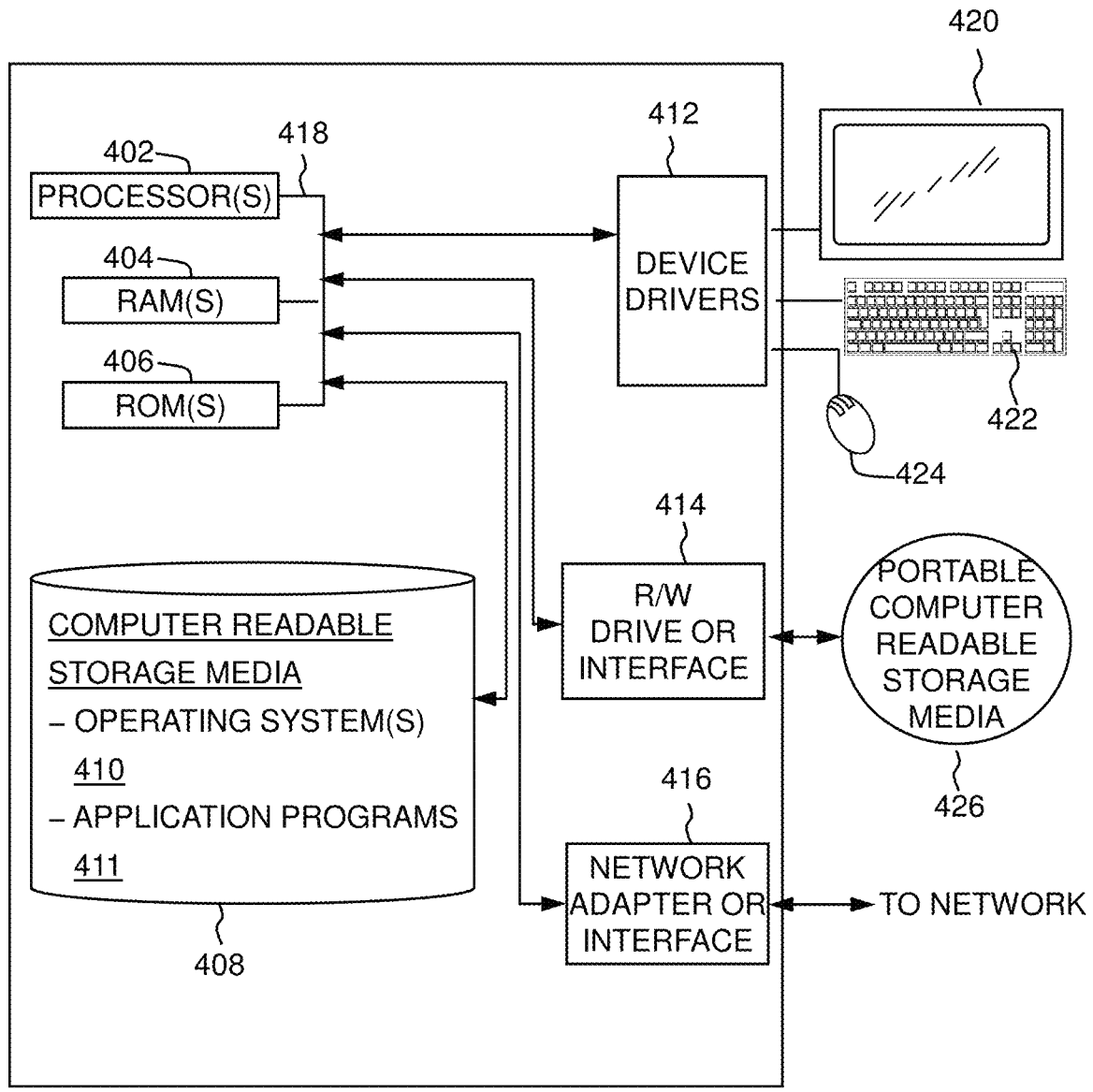
FIG. 4 is a block diagram of an embodiment of a computer system or cloud server in which embodiments of the present invention may be implemented.

FIG. 4 depicts a block diagram of components of a computing system 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The computing system can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 414 to read from and write to one or more portable computer readable storage media 426. Application programs 411 on the computing system can be stored on one or more of the portable computer readable storage media 426, read via the respective R/W drive or interface 414 and loaded into the respective computer readable storage media 408.

The computing system can also include a network adapter or interface 416, such as a TCP/IP adapter card or wireless communication adapter. Application programs 411 on the computing system can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

The computing system can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing:

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
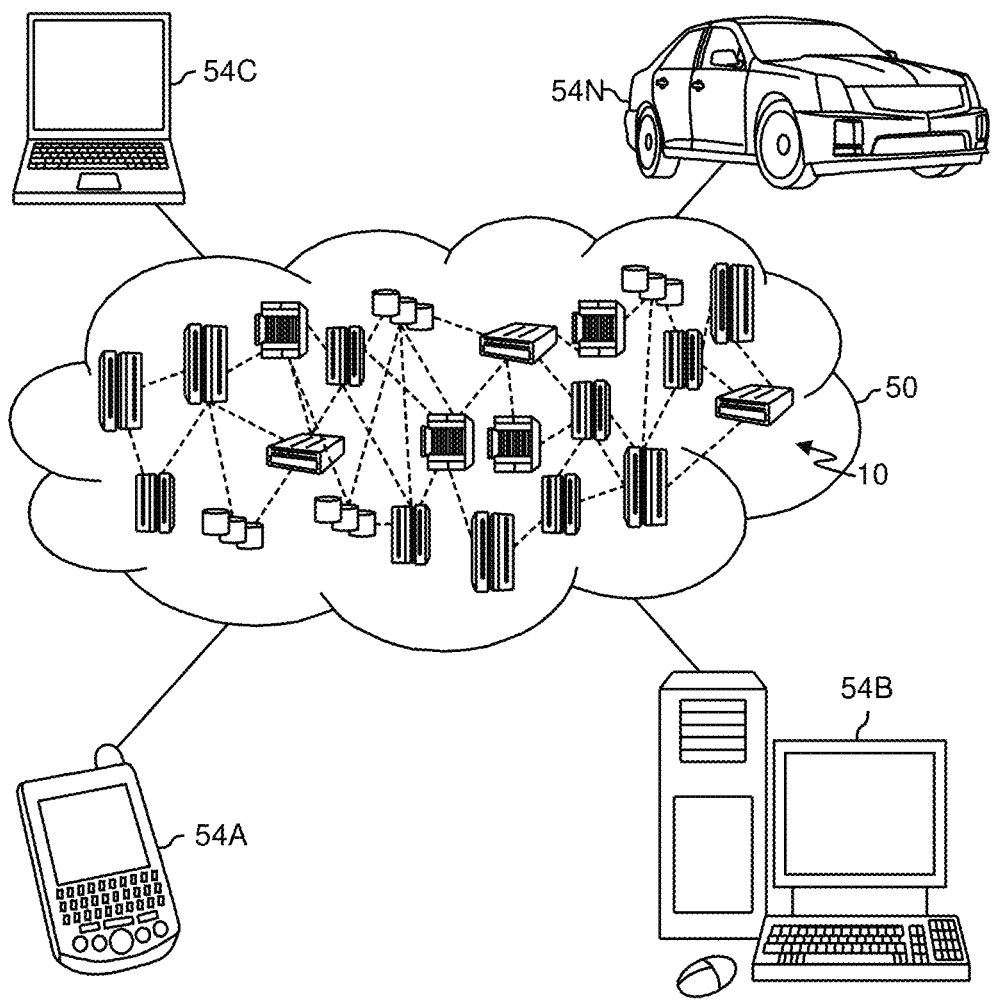
FIG. 5 is a schematic diagram of a cloud computing environment in which embodiments of the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (for example, using a web browser).

Figure 6:
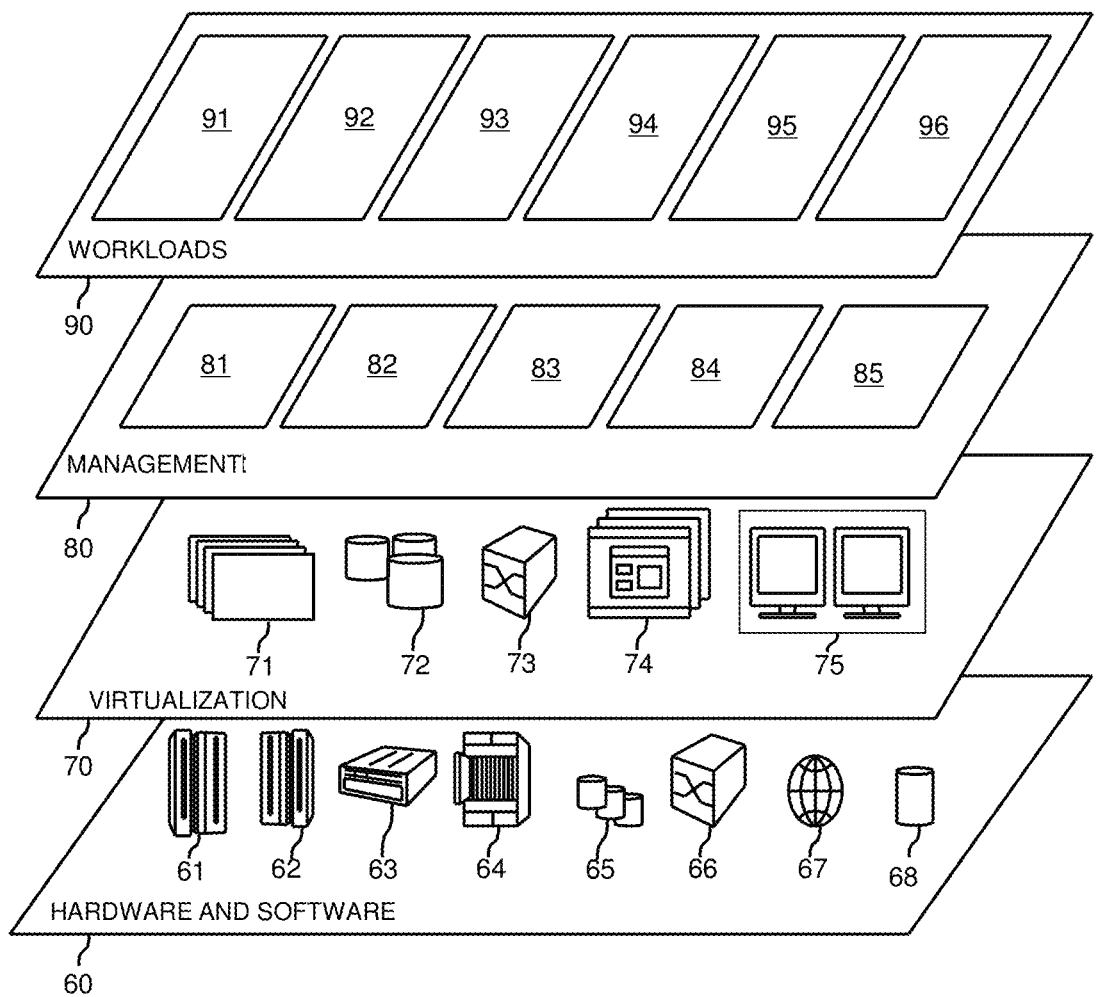
FIG. 6 is a diagram of abstraction model layers of a cloud computing environment in which embodiments of the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content association processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method comprising:
providing a set of files including one or more files, with the set of files including a first element currently being edited and including second elements, with the first element being an alphanumeric text based element and the second elements being audiovisual elements;
establishing content of the first element and the second elements by analyzing the first element and the second elements using natural language understanding and parsing resultant text;
receiving a change to the first element, wherein the change to the first element comprises a change of text included in the first element;
analyzing the change to the first element using a model that classifies the change to the first element and generates keywords;
identifying a respective one of the second elements by determining a correlation between the change to the first element and the respective one of the second elements using the keywords, and a modification required to the respective one of the second elements to be consistent with a substance of the change to the first element; and
responsive to the identification of the modification, saving a version of the set of files that incorporates the change to the first element and the modification to the respective one of the second elements,
wherein the providing, the establishing, the receiving, the analyzing, the identifying, and the saving are performed by a file editing tool on a computing system.

2. The computer-implemented method of claim 1, wherein the model analyzes and classifies the change to the first element using semantic analysis and natural language classification.

3. The computer-implemented method of claim 2, wherein the semantic analysis and natural language classification include:
keyword extraction;
establishing relationships between objects;
parsing for lexical elements including verbs, nouns, sentences, paragraphs, and headings;
establishing subject-verb-object relationships;
establishing sequences;
associating significance with predefined words;
establishing a domain of information based on relationship between objects in input; and
identifying significant typography in the domain.

4. The computer-implemented method of claim 1, further comprising issuing an alert to a user that the respective one of the second elements is correlated with the first element.

5. The computer-implemented method of claim 1, further comprising automatically making the modification to the respective one of the second elements.

6. The computer-implemented method of claim 1, wherein a scope of a search for the identifying the respective one of the second elements in the set of files is customizable as a file in the set of files that is open for editing and contains the first element.

7. The computer-implemented method of claim 1, wherein a scope of a search for the identifying the respective one of the second elements in the set of files is customizable as a collection of files in the set of files.

8. The computer-implemented method of claim 1, wherein a scope of a search for the identifying the respective one of the second elements in the set of files is customizable as one of (i) a file in the set of files that is open for editing and contains the first element or (ii) a collection of files in the set of files.

9. The computer-implemented method of claim 1, wherein:
the file editing tool comprises a customizable setting that defines a scope of a search for the identifying the respective one of the second elements in the set of files, and
the file editing tool comprises a proximity component for defining a proximity to the first element in which the respective one of the second elements is located.

10. A computer-implemented method comprising:
providing a set of files including one or more files, with the set of files including a first element currently being edited and including second elements, with the first element being an alphanumeric text based element and the second elements being still image elements;

establishing content of the second elements by analyzing the second elements using optical character recognition and parsing resultant text;

receiving a change to the first element, wherein the change to the first element comprises a change of text included in the first element;

analyzing the change to the first element using a model that classifies the change to the first element and generates keywords;

identifying a respective one of the second elements by determining a correlation between the change to the first element and the respective one of the second elements using the keywords, and a modification required to the respective one of the second elements to be consistent with a substance of the change to the first element; and responsive to the identification of the modification, saving a version of the set of files that incorporates the change to the first element and the modification to the respective one of the second elements, wherein the providing, the establishing, the receiving, the analyzing, the identifying, and the saving are performed by a file editing tool on a computing system.

11. A computer-implemented method comprising:

providing a set of files including one or more files, with the set of files including a first element currently being edited and including second elements, with the first element being an alphanumeric text based element and the second elements being audio elements;

establishing content of the second elements by analyzing the second elements using voice recognition and parsing resultant text;

receiving a change to the first element, wherein the change to the first element comprises a change of text included in the first element;

analyzing the change to the first element using a model that classifies the change to the first element and generates keywords;

identifying a respective one of the second elements by determining a correlation between the change to the first element and the respective one of the second elements using the keywords, and a modification required to the respective one of the second elements to be consistent with a substance of the change to the first element; and responsive to the identification of the modification, saving a version of the set of files that incorporates the change to the first element and the modification to the respective one of the second elements, wherein the providing, the establishing, the receiving, the analyzing, the identifying, and the saving are performed by a file editing tool on a computing system.

* * * * *